United States Patent
Panchal

(10) Patent No.: US 11,197,211 B1
(45) Date of Patent: Dec. 7, 2021

(54) SYSTEMS AND METHODS FOR DEFINING AN EXCLUSION ZONE TO PROTECT AN EARTH STATION FROM USER EQUIPMENT INTERFERENCE

(71) Applicant: Verizon Patent and Licensing Inc., Basking Ridge, NJ (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/947,755

(22) Filed: Aug. 14, 2020

(51) Int. Cl.
*H04W 36/00* (2009.01)
*H04W 76/18* (2018.01)
*H04W 4/021* (2018.01)
*H04W 36/32* (2009.01)

(52) U.S. Cl.
CPC ....... *H04W 36/0079* (2018.08); *H04W 4/022* (2013.01); *H04W 36/32* (2013.01); *H04W 76/18* (2018.02)

(58) Field of Classification Search
CPC . H04W 36/0079; H04W 76/18; H04W 4/022; H04W 36/32
See application file for complete search history.

(56) References Cited

U.S. PATENT DOCUMENTS

| | | | | |
|---|---|---|---|---|
| 2004/0116134 A1* | 6/2004 | Maeda | ............... | H04B 7/1855 455/457 |
| 2009/0163237 A1* | 6/2009 | Abedi | ............... | H04W 16/14 455/501 |
| 2010/0272038 A1* | 10/2010 | Hamalainen | ......... | H04W 16/14 370/329 |
| 2011/0069630 A1* | 3/2011 | Doppler | ............... | H04W 16/14 370/252 |
| 2016/0119835 A1* | 4/2016 | Sun | ................... | H04W 36/0085 455/444 |

* cited by examiner

*Primary Examiner* — Michael Y Mapa

(57) ABSTRACT

A network device may determine a geographical distance between an earth station and the network device. The network device may receive a plurality of geographical distances between the earth station and a corresponding plurality of other network devices. The network device may determine location coordinate points for an exclusion zone, associated with the earth station, based on the geographical distance and the plurality of geographical distances. The network device may generate an exclusion zone system information block that includes the location coordinate points for the exclusion zone. The network device may determine a state of a user equipment associated with the network device. The network device may provide, to the user equipment, the exclusion zone system information block based on the state of the user equipment.

20 Claims, 10 Drawing Sheets

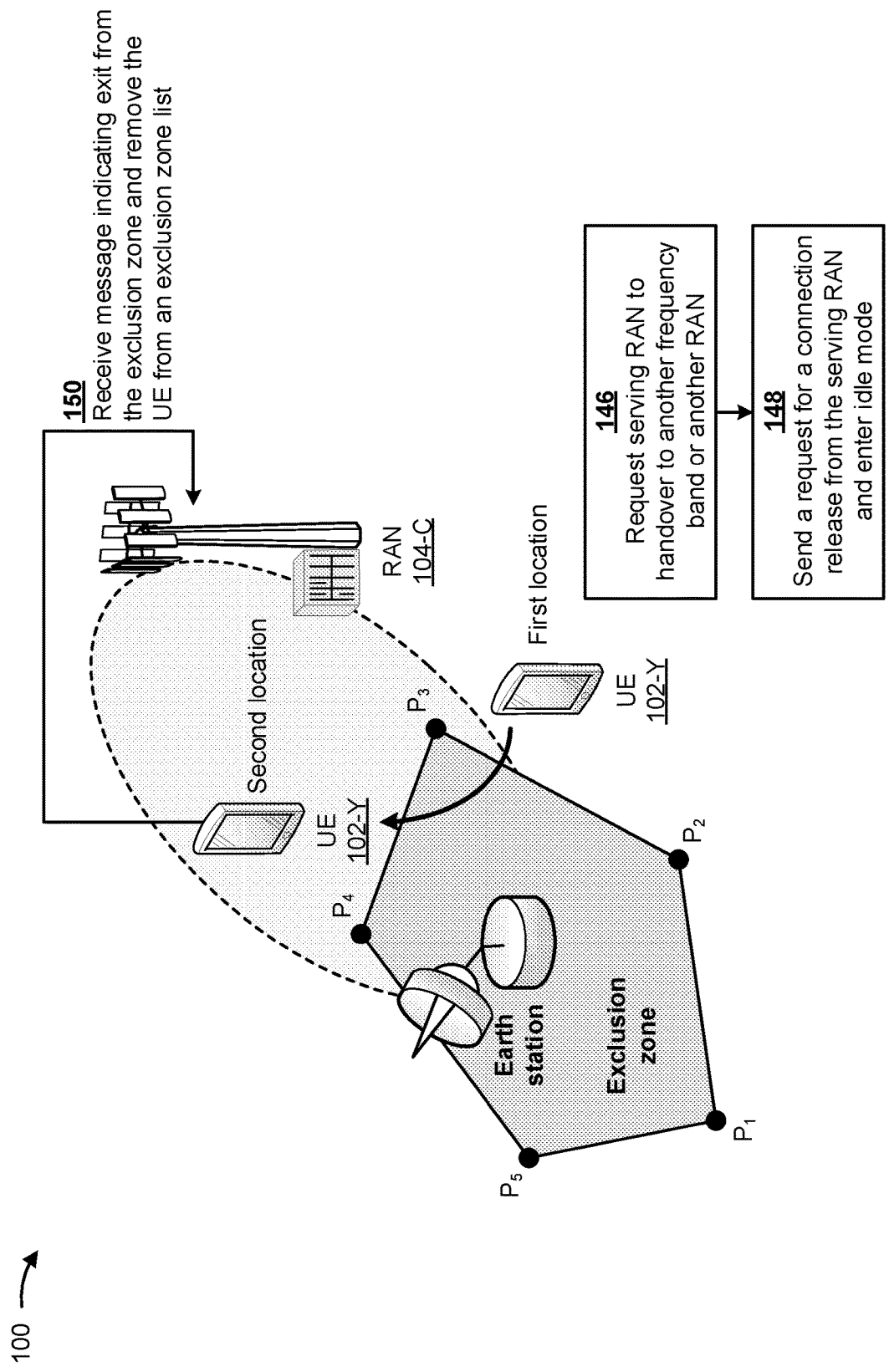

SYSTEMS AND METHODS FOR DEFINING AN EXCLUSION ZONE TO PROTECT AN EARTH STATION FROM USER EQUIPMENT INTERFERENCE

BACKGROUND

An earth station is typically the terrestrial radio station portion of a satellite telecommunications network and is used primarily for transmission and reception of radio waves from satellite radio sources. A strict out-of-band emission (OOBE) is defined to protect incumbent earth station operation in a particular range (e.g., about a 4 to 4.2 gigahertz (GHz) range).

BRIEF DESCRIPTION OF THE DRAWINGS

FIGS. 1A-1G are diagrams of one or more example implementations described herein.

DETAILED DESCRIPTION OF PREFERRED EMBODIMENTS

Figure 1A:
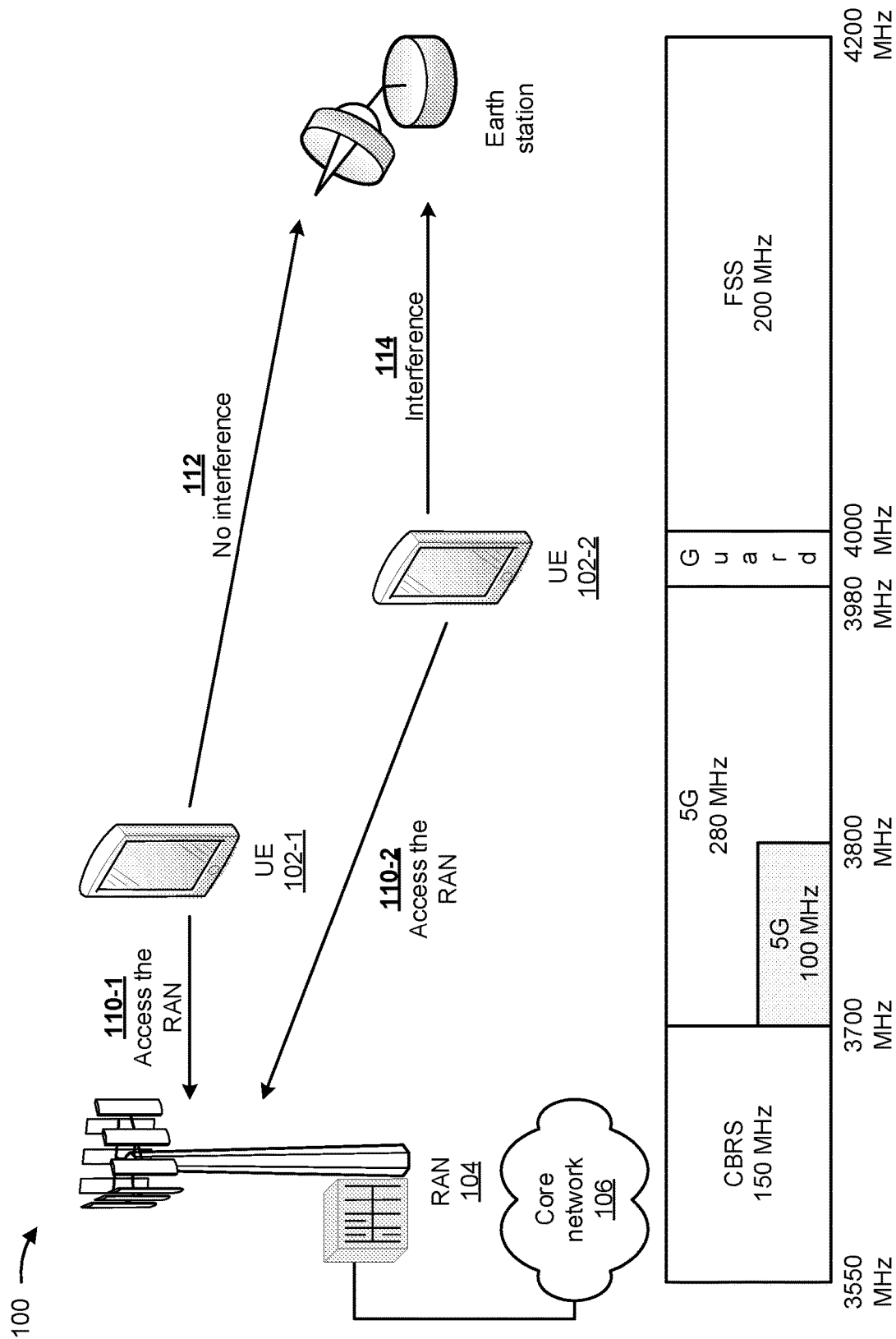

The following detailed description of example implementations refers to the accompanying drawings. The same reference numbers in different drawings may identify the same or similar elements.

A base station of a radio access network (RAN) may include multiple tools for limiting OOBE to an earth station, such as reducing power, adjusting antenna tilt, and/or the like. However, a UE transmitting to the base station (e.g., on an uplink) creates unique challenges associated with OOBE to the earth station. A guard frequency band (e.g., of 20 megahertz (MHz), 200 MHz, and/or the like) may be provided between a fifth generation (5G) frequency band (e.g., about 3,700 MHz to about 3,980 MHz, about 3,700 MHz to about 3,800 MHz, and/or the like) generated by the base station and a frequency band (e.g., about 4,000 MHz to about 4,200 MHz) generated by the earth station. Unfortunately, the guard frequency band insufficiently protects the earth station from the UE located near the earth station and transmitting to the base station. Currently, the base station of the RAN does not include any mechanisms to control aspects of a UE operating near the earth station, such as detecting whether the UE is operating near the earth station. This, in turn, wastes computing resources (e.g., processing resources, memory resources, communication resources, and/or the like), networking resources, and/or the like associated with the UE and the earth station creating interference and not operating correctly, identifying the interference between the UE and the earth station, correcting the interference between the UE and the earth station, attempting to retrieve data not received due to the interference, and/or the like.

Some implementations described herein provide a device (e.g., a network device of a RAN, such as a base station) that defines an exclusion zone to protect an earth station from UE interference. For example, the network device may determine a geographical distance between an earth station and the network device, and may receive a plurality of geographical distances between the earth station and a corresponding plurality of other network devices. The network device may determine location coordinate points for an exclusion zone, associated with the earth station, based on the geographical distance and the plurality of geographical distances, and may generate an exclusion zone system information block that includes the location coordinate points for the exclusion zone. The network device may determine a state of a UE associated with the network device, and may provide, to the UE, the exclusion zone system information block based on the state of the UE.

In this way, the network device defines an exclusion zone to protect an earth station from UE interference. The exclusion zone may protect the earth station by causing a UE, located near the earth station and attempting to access RAN services in the 5G frequency band, to operate in a restricted mode. Ideally, the exclusion zone may enable the UE to recognize when the UE is operating near the earth station. If the UE is within the exclusion zone and may potentially impact operation of the earth station, then the UE may not attempt to access the RAN. Thus, defining the exclusion zone to protect the earth station from UE interference conserves resources. that would otherwise have been wasted by incorrect operation of the UE and the earth station due to interference, identifying the interference between the UE and the earth station, correcting the interference between the UE and the earth station, attempting to retrieve data not received due to the interference, and/or the like.

FIGS. 1A-1G are diagrams of one or more example implementations 100 described herein. As shown in FIG. 1A, UE 102-1 and UE 102-2 (collectively referred to as UEs 102, and singularly as UE 102) may be associated with a RAN 104 connected to a core network 106. UE 102 may include a mobile phone, a laptop computer, a tablet computer, an IoT device and/or the like. RAN 104 may include one or more network devices, such as radio transmitters, base stations, and/or the like. Core network 106 may include an example architecture of a 5G next generation (NG) core network included in a 5G wireless telecommunications system, and may include physical elements, virtual elements, or a combination of physical and virtual elements. As further shown, an earth station may be geographically located near to RAN 104. Although implementations are described herein in connection with a 5G NG core network, the implementations may be utilized with other types of core networks, such as a 4G core network.

As further shown in FIG. 1A, RAN 104 may provide a first frequency band (e.g., about 3,550 MHz to about 3,700 MHz) for a citizens band radio service (CBRS), such as a shared wireless private broadband service. RAN 104 may provide a second frequency band (e.g., about 3,700 MHz to about 3,980 MHz, about 3,700 MHz to about 3,800 MHz, and/or the like) for 5G wireless services provided to UEs 102. The earth station may provide a third frequency band (e.g., about 4,000 MHz to about 4,200 MHz) for extraplanetary telecommunication with terrestrial devices, (e.g., satellites, space ships, space stations, rockets, and/or the like) or for reception of radio waves from astronomical radio sources. A guard frequency band (e.g., about 3,980 MHz to about 4,000 MHz, about 3,800 MHz to about 4,000 MHz, and/or the like) may be provided between the second frequency band provided by RAN 104 and the third frequency band provided by the earth station.

As further shown in FIG. 1A, and by reference number 110-1, a first UE 102-1 located within the second frequency band (e.g., the 5G frequency band) may access RAN 104.

For example, the first UE 102-1 may attempt to access or access RAN 104 to receive 5G services from RAN 104. As shown by reference number 110-2, a second UE 102-2 located within the guard frequency band may also access or attempt to access RAN 104 to receive 5G services from RAN 104.

A shown in FIG. 1A, and by reference number 112, the first UE 102-1 may not cause interference with the earth station due to the location of the first UE 102-1 within the second frequency band. However, as shown by reference number 114, the second UE 102-2 may cause interference with the earth station due to the location of the second UE 102-1 within the guard frequency band.

Figure 1B:
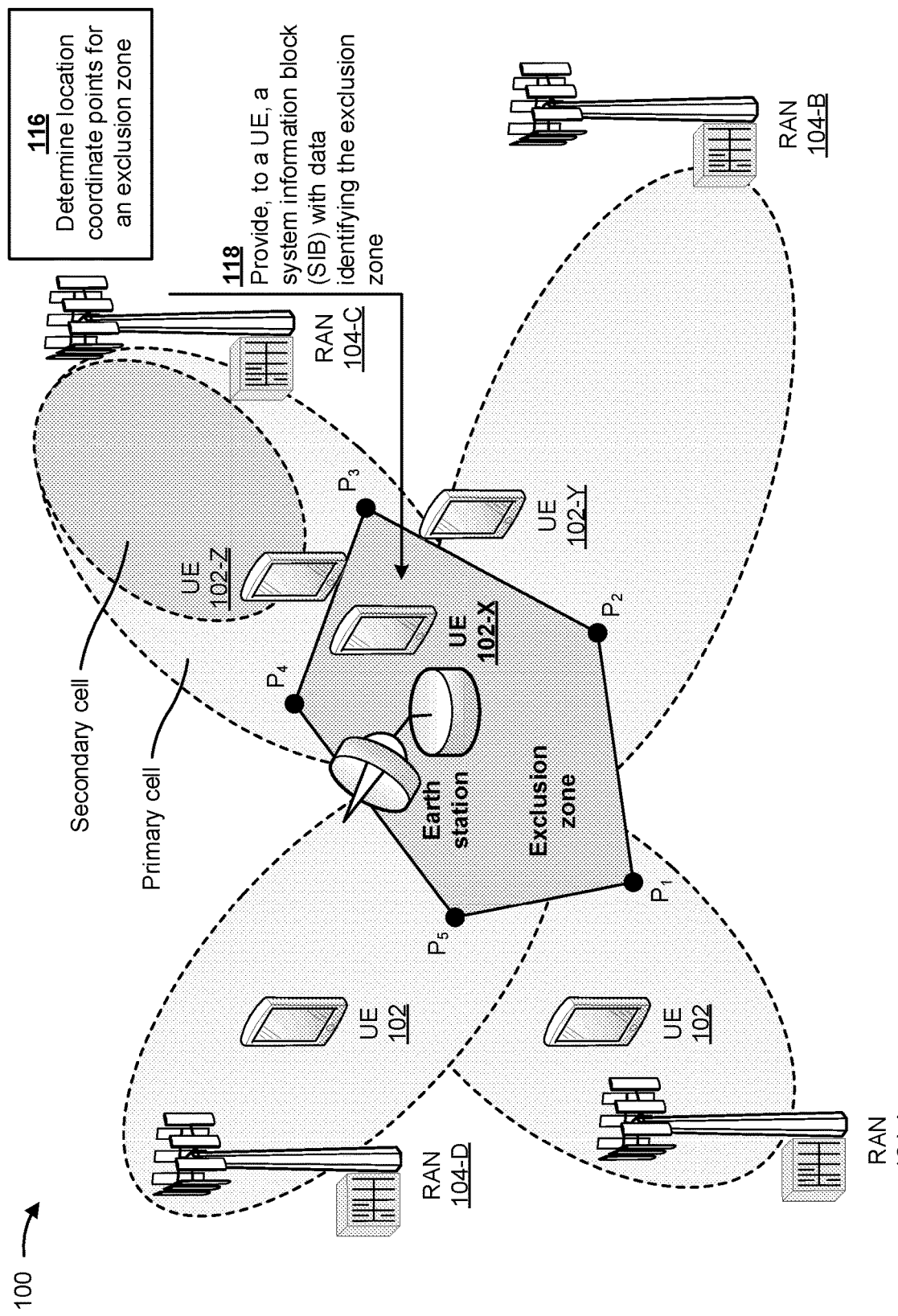

As shown in FIG. 1B, multiple RANs 104 (e.g., RAN 104-A, RAN 104-B, RAN 104-C, and RAN 104-D) may be associated with multiple UEs 102 (e.g., UE 102-X, UE 102-Y, UE 102-Z, and/or the like). A further shown, RAN 104-C may generate a primary cell (e.g., a primary geographical area covered by RAN 104-C) and a secondary cell (e.g., secondary geographical area covered by RAN 104-C). In some implementations, the primary cell covers a larger geographical area than the geographical area covered by the secondary cell. Further details of the primary cell and the secondary cell are provided below in connection with FIGS. 1E and 1F. Further details of FIG. 1B are described with reference to RAN 104-C, but may also be performed by other RANs 104 of FIG. 1B, such as RAN 104-A, RAN 104-B, and/or RAN 104-D.

RAN 104-C may determine a geographical distance between the earth station and RAN 104-C. For example, RAN 104-C may determine the geographical distance between the earth station and RAN 104-C based on radio signal strength of the earth station received by RAN 104-C. In another example, RAN 104-C may determine the geographical distance between the earth station and RAN 104-C based on receiving a geographical map that identifies location coordinates of the earth station and calculating the geographical distance based on the location coordinates of the earth station and location coordinates of RAN 104-C.

RAN 104-A, RAN 104-B, and RAN 104-D may also determine geographical distances between the earth station and RAN 104-A, RAN 104-B, and RAN 104-D, respectively, in a similar manner. RAN 104-A, RAN 104-B, and RAN 104-D may provide, to RAN 104-C, the determined geographical distances between the earth station and RAN 104-A, RAN 104-B, and RAN 104-D, respectively, and RAN 104-C may receive the determined geographical distances between the earth station and RAN 104-A, RAN 104-B, and RAN 104-D.

As further shown in FIG. 1B, and by reference number 116, RAN 104-C may determine location coordinate points for an exclusion zone, associated with the earth station, based on the geographical distance between the earth station and RAN 104-C and the geographical distances between the earth station and RAN 104-A, RAN 104-B, and RAN 104-D. In some implementations, RAN 104-C determines the location coordinate points for the exclusion zone based on the geographical distance between the earth station and RAN 104-C, the geographical distances between the earth station and RANs 104-A, 104-B, and 104-D, and likelihoods of UEs 102 in the exclusion zone (e.g., defined by the location coordinate points) impacting operation of the earth station. In some implementations, RAN 104-C determines multiple exclusion zones for the earth station and location coordinate points for each of the multiple exclusion zones. The exclusion zone may protect the earth station from experiencing interference signals from UEs 102 geographically located with the exclusion zone, and may reduce OOBE downlink signaling by RAN 104-C based on preventing UEs 102, geographically located with the exclusion zone, from accessing RAN 104-C.

In some implementations, RAN 104-C generates an exclusion zone system information block (SIB) with data identifying the location coordinate points for the exclusion zone. RAN 104-C may provide the exclusion zone SIB to UEs 102 associated with RAN 104-C in various ways that are based on states of UEs 102. Thus, RAN 104-C may determine states (e.g., idle or inactive states, mobility states, carrier aggregation states, dual connectivity states, and/or the like) of UEs 102 associated with RAN 104-C based on signaling received from UEs 102 associated with RAN 104-C. As further shown in FIG. 1B, and by reference number 118, RAN 104-C may provide, to UE 102-X, a SIB with data identifying the exclusion zone. For example, RAN 104-C may provide, to UE 102-X, the SIB with the data identifying the location coordinate points for the exclusion zone based on a state of UE 102-X.

Figure 1C:
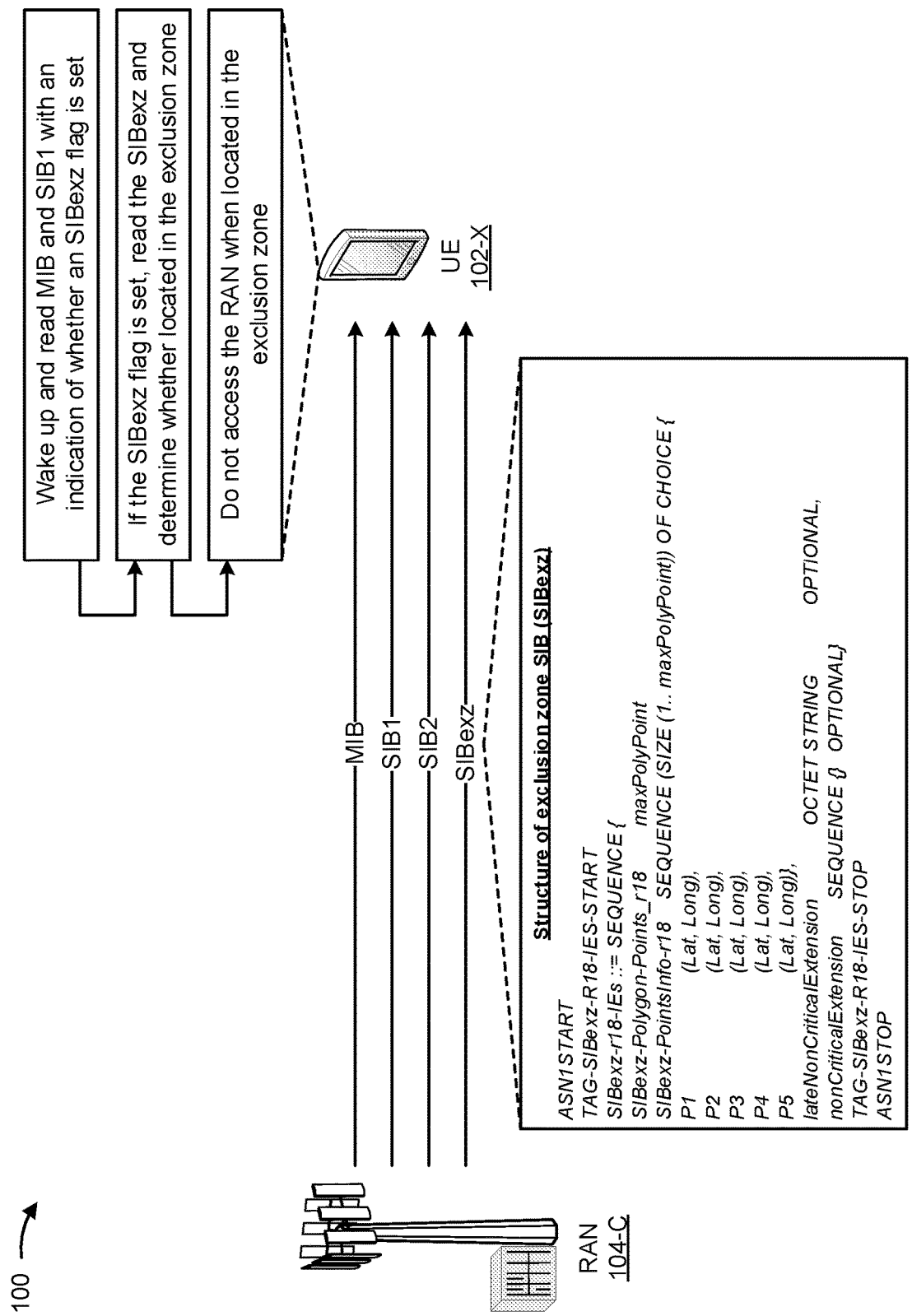

As shown in FIG. 1C, and when the state of UE 102-X is an idle state or an inactive state, RAN 104-C may provide, to UE 102-X, a master information block (MIB) and multiple SIBs, such as a first SIB (SIB1), a second SIB (SIB2), the exclusion zone SIB (SIBexz), and/or the like. The MIB may include a quantity of parameters that are utilized by UE 102-X to acquire other information from RAN 104-C. The first SIB may include an indication of whether a flag is set for the exclusion zone SIB. If the flag is set in the first SIB, UE 102-X may read the exclusion zone SIB. If the flag is not set in the first SIB, UE 102-X may not read the exclusion zone SIB. The first SIB and/or the second SIB may include information that is utilized by UE 102-X to perform functions associated with RAN 104-C, such as cell selection, cell reselection, cell handover, and/or the like.

The exclusion zone SIB may include the data identifying the location coordinate points for the exclusion zone. For example, as shown in FIG. 1B, the exclusion zone SIB may include the following example data.

```
ASN1START
TAG-SIBexz-R18-IES-START
SIBexz-r18-IEs ::= SEQUENCE {
   SIBexz-Polygon-Points_r18 maxPolyPoint
   SIBexz-PointsInfo-r18SEQUENCE (SIZE (1.. maxPolyPoint))
   OF CHOICE {
      P1 (Lat, Long),
      P2 (Lat, Long),
      P3 (Lat, Long),
      P4 (Lat, Long),
      P5 (Lat, Long),
      . . .
      Pn (Lat, Long)
   },
   lateNonCriticalExtension   OCTET STRING    OPTIONAL,
   nonCriticalExtension       SEQUENCE { }    OPTIONAL
}
TAG-SIBexz-R18-IES-STOP
ASN1STOP
```

As further shown in FIG. 1C, UE 102-X may wake up or power on from the idle state or the inactive state, and may read the MIB and the first SIB with the indication of whether the flag is set for the exclusion zone SIB. If the flag is set for the exclusion zone SIB, UE 102-X may read the exclusion zone SIB to identify the location coordinate points of the exclusion zone, and may determine whether UE 102-X is located in the exclusion zone based on the location coordinate points and a location of UE 102-X. If UE 102-X determines that UE 102-X is located in the exclusion zone, UE 102-X may not access RAN 104-C to prevent interference with the earth station. If the flag is not set for the exclusion zone SIB or UE 102-X is not located in the exclusion zone, UE 102-X may access RAN 104-C since UE 102-X may not interfere with the earth station.

Figure 1D:
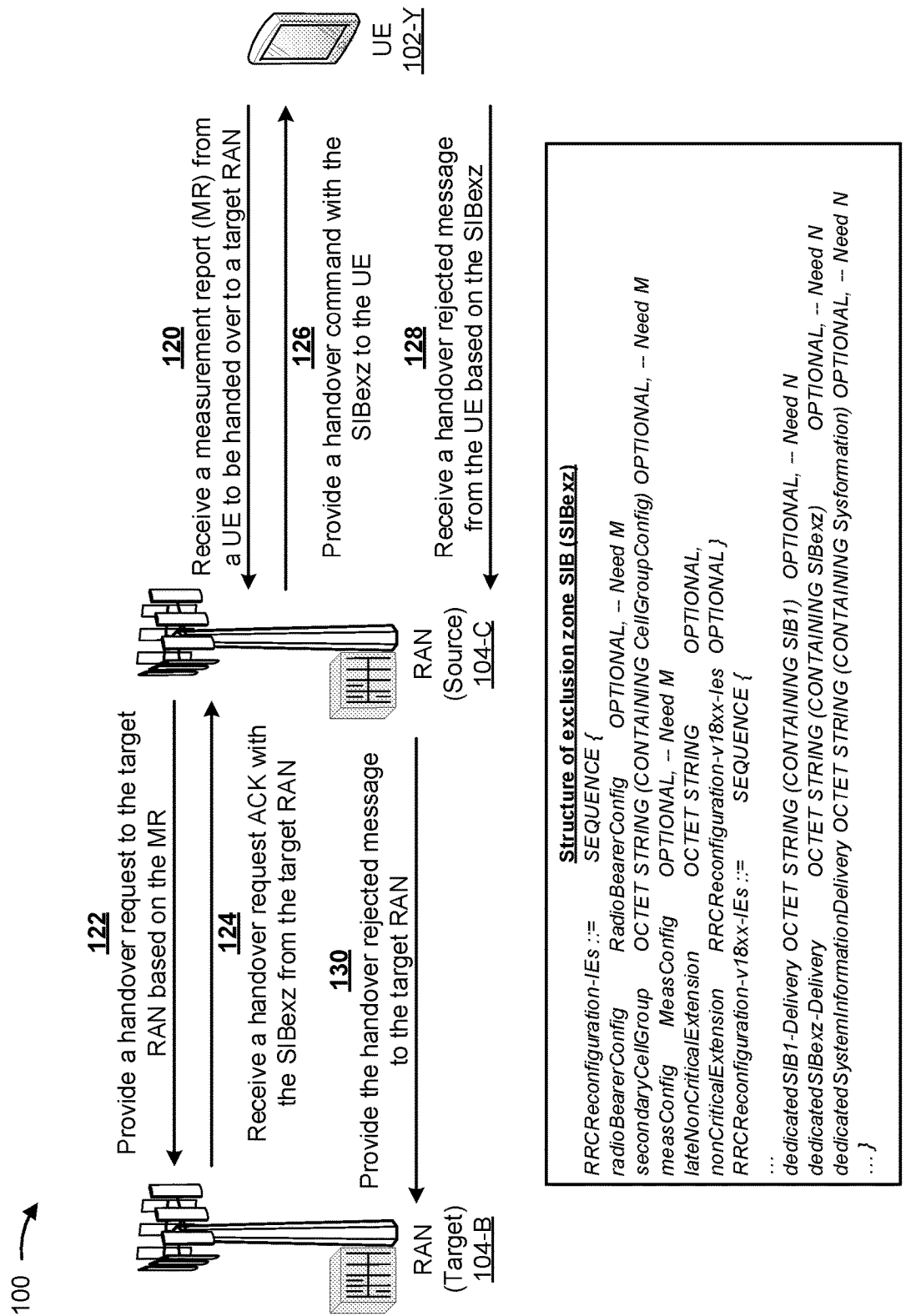

As shown in FIG. 1D, by reference number 120, and when a state of UE 102-Y is a mobility state or a handover state, RAN 104-C (e.g., a source RAN) may receive, from UE 102-Y, a measurement report to be handed over to a target RAN (e.g., RAN 104-B). UE 102-Y may provide the measurement report to RAN 104-C when UE 102-Y is geographically located at a boundary between RAN 104-C and RAN 104-B. In some implementations, the measurement report includes data identifying a signal strength between RAN 104-C and UE 102-Y, a signal strength between RAN 104-B and UE 102-Y, and/or the like. RAN 104-C may determine whether to hand over UE 102-Y to RAN 104-B based on the measurement report.

As further shown in FIG. 1D, and by reference number 122, if RAN 104-C determines that UE 102-Y may be handed over to RAN 104-B, RAN 104-C may provide a handover request to RAN 104-B based on the measurement report. For example, RAN 104-C may determine that the signal strength between UE 102-Y and RAN 104-B is greater than the signal strength between UE 102-Y and RAN 104-C. RAN 104-C may provide the handover request to RAN 104-B based on determining that the signal strength between UE 102-Y and RAN 104-B is greater than the signal strength between UE 102-Y and RAN 104-C.

RAN 104-B may approve the handover request and may provide a handover request acknowledgment (ACK) to RAN 104-C. In some implementations, the handover request acknowledgment includes the exclusion zone SIB with the data identifying the location coordinate points of the exclusion zone. The exclusion zone SIB may be provided to RAN 104-C via a mobility control container. As further shown in FIG. 1D, and by reference number 124, RAN 104-C may receive, from RAN 104-B, the handover request acknowledgment with the exclusion zone SIB.

The exclusion zone SIB may include the data identifying the location coordinate points for the exclusion zone. For example, as shown in FIG. 1D, the exclusion zone SIB may include the following example data.

```
RRCReconfiguration-IEs: = SEQUENCE {
    radioBearerConfig          OPTIONAL, -- Need M
    secondaryCellGroup OCTET STRING (CONTAINING
CellGroupConfig) OPTIONAL, -- Need M
    measConfig                 OPTIONAL, -- NeedM
    lateNonCriticalExtension   OCTET STRING   OPTIONAL,
    nonCriticalExtension RRCReconfiguration-v18xx-IEs   OPTIONAL
}
RRCReconfiguration-v18xx-IEs: = SEQUENCE {
    ...
    dedicatedSIB1-Delivery    OCTET STRING (CONTAINING SIB1)
OPTIONAL, --Need N
    dedicatedSIBexz-Delivery OCTET STRING (CONTAINING SIBexz)
OPTIONAL, -- Need N
dedicatedSystemInformationDelivery OCTET STRING (CONTAINING
SystemInformation) OPTIONAL, -- Need N
    ...
}
```

As further shown in FIG. 1D, and by reference number 126, RAN 104-C may provide, to UE 102-Y, a handover command with the exclusion zone SIB. In some implementations, the handover command includes a radio resource control (RRC) reconfiguration message indicating that UE 102-Y is to be reconfigured to hand over to RAN 104-B. UE 102-Y may read the exclusion zone SIB to identify the location coordinate points of the exclusion zone, and may determine whether UE 102-Y is located in the exclusion zone based on the location coordinate points and a location of UE 102-Y. If UE 102-Y determines that UE 102-Y is located in the exclusion zone, UE 102-Y may reject the handover command with a handover rejected message. In some implementations, the handover rejected command includes an RRC reconfiguration failure message (e.g., with a reason code indicating that UE 102-Y is located in the exclusion zone). If UE 102-Y determines that UE 102-Y is not located in the exclusion zone, UE 102-Y may accept the handover command and may perform a handover to RAN 104-B.

As further shown in FIG. 1D, and by reference number 128, since UE 102-Y is located in the exclusion zone, RAN 104-C may receive, from UE 102-Y, the handover rejected message based on the exclusion zone SIB. As shown by reference number 130, RAN 104-C may provide, to RAN 104-B, the handover rejected message (e.g., with the reason code indicating that UE 102-Y is located in the exclusion zone) so that RAN 104-B may cease preparing for a handover from UE 102-Y.

In some implementations, and to avoid frequently repeated signaling, RAN 104-C includes a configurable prohibit timer that suspends the handover process of UE 102-Y, from RAN 104-C to RAN 104-B, until the prohibit timer expires. Upon expiry of the prohibit timer, RAN 104-C may permit any future request to hand over to RAN 104-B based on an assumption that UE 102-Y has moved out of the exclusion zone. In some implementations, and to avoid frequently repeated signaling, UE 102-Y may not provide the measurement report to RAN 104-C when UE 102-Y is still located within the exclusion zone.

Figure 1E:
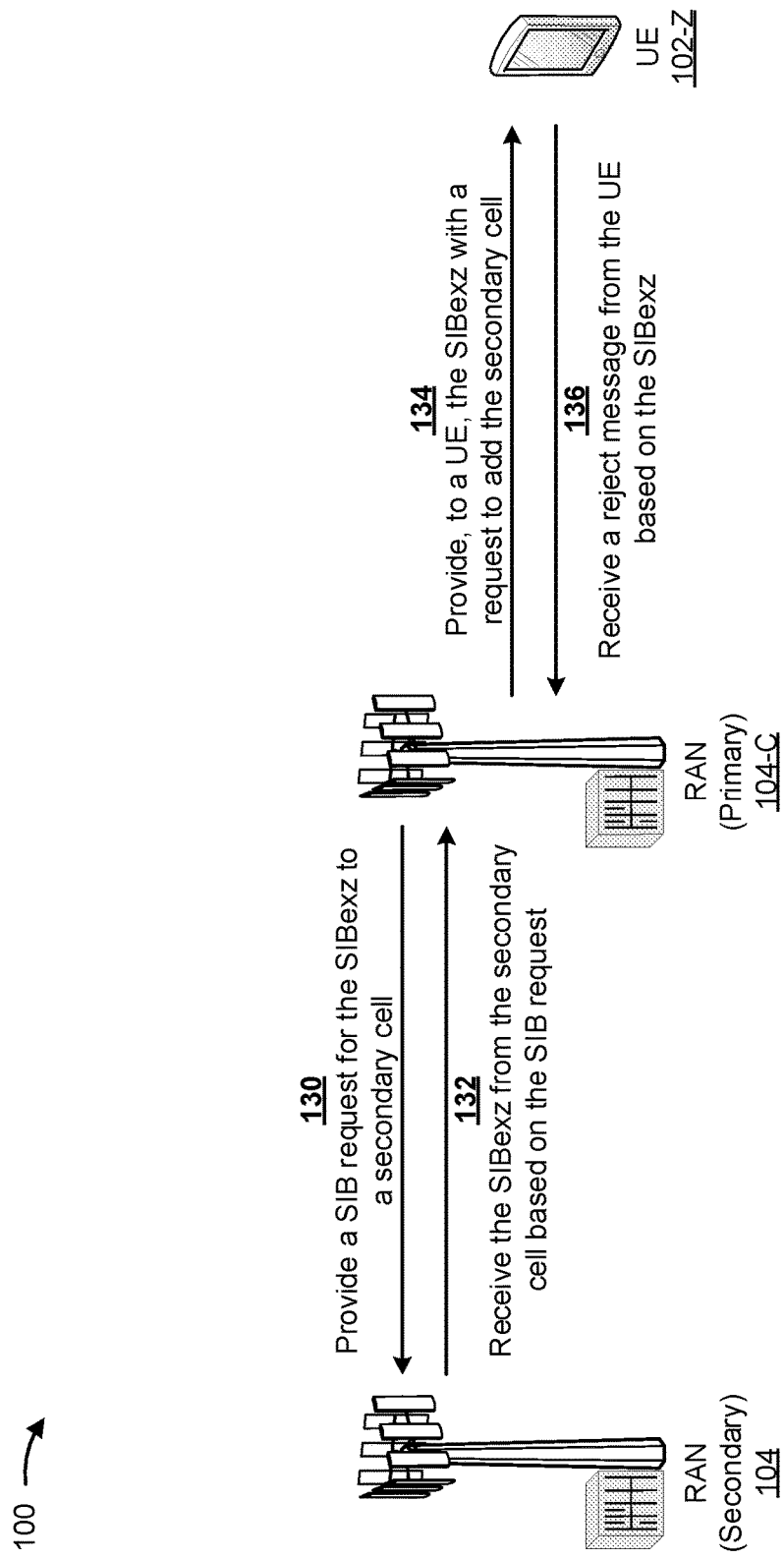

As shown in FIG. 1E, by reference number 130, and when a state of UE 102-Z is a carrier aggregation state and RAN 104-C is a primary RAN, RAN 104-C (e.g., a primary RAN) may provide, to a secondary RAN, a SIB request for the exclusion zone SIB. Carrier aggregation is a technique utilized to increase a data rate per UE 102, whereby multiple frequency blocks are assigned to the same UE 102 (e.g., frequency blocks from the primary RAN and frequency blocks from the secondary RAN).

As further shown in FIG. 1E, and by reference number 132, RAN 104-C may receive, from the secondary RAN, the exclusion zone SIB, with the data identifying the location coordinate points of the exclusion zone, based on the SIB request. As shown by reference number 134, RAN 104-C may provide, to UE 102-Z, the exclusion zone SIB with a request to add the secondary RAN for carrier aggregation purposes. In some implementations, the request to add the secondary RAN includes an RRC reconfiguration message indicating that UE 102-Z is to be reconfigured to add the secondary RAN. UE 102-Z may read the exclusion zone SIB to identify the location coordinate points of the exclusion zone, and may determine whether UE 102-Z is located in the exclusion zone based on the location coordinate points and a location of UE 102-Z. If UE 102-Z determines that UE 102-Z is located in the exclusion zone, UE 102-Z may reject the request to add the secondary RAN with a reject message. In some implementations, the reject message includes an RRC reconfiguration failure message (e.g., with a reason code indicating that UE 102-Z is located in the exclusion zone). If UE 102-Z determines that UE 102-Z is not located in the exclusion zone, UE 102-Z may accept the request to add the secondary RAN and may add the secondary RAN for carrier aggregation purposes.

As further shown in FIG. 1E, and by reference number 136, since UE 102-Z is located in the exclusion zone, RAN 104-C may receive, from UE 102-Z, the reject message based on the exclusion zone SIB. The reject message may cause RAN 104-C to cease preparing for adding the secondary RAN for UE 102-Z.

In some implementations, and to avoid frequently repeated signaling, RAN 104-C includes a configurable prohibit timer that suspends the carrier aggregation process of UE 102-Z until the prohibit timer expires. Upon expiry of the prohibit timer, RAN 104-C may permit any future request to add the secondary RAN based on an assumption that UE 102-Z has moved out of the exclusion zone. In some implementations, if UE 102-Z continues to reject the request to add the secondary RAN after expiration of the timer, RAN 104-C may increase a value of the prohibit timer so that the carrier aggregation process is suspended for a longer period of time. Eventually (e.g., after UE 102-Z still continues to reject the request to add the secondary RAN), RAN 104-C may permanently prevent UE 120-Z from adding the secondary RAN. For example, RAN 104-C may permanently prevent UE 120-Z from adding the secondary RAN when UE 102-Z is a fixed wireless access device operating in the exclusion zone.

Figure 1F:
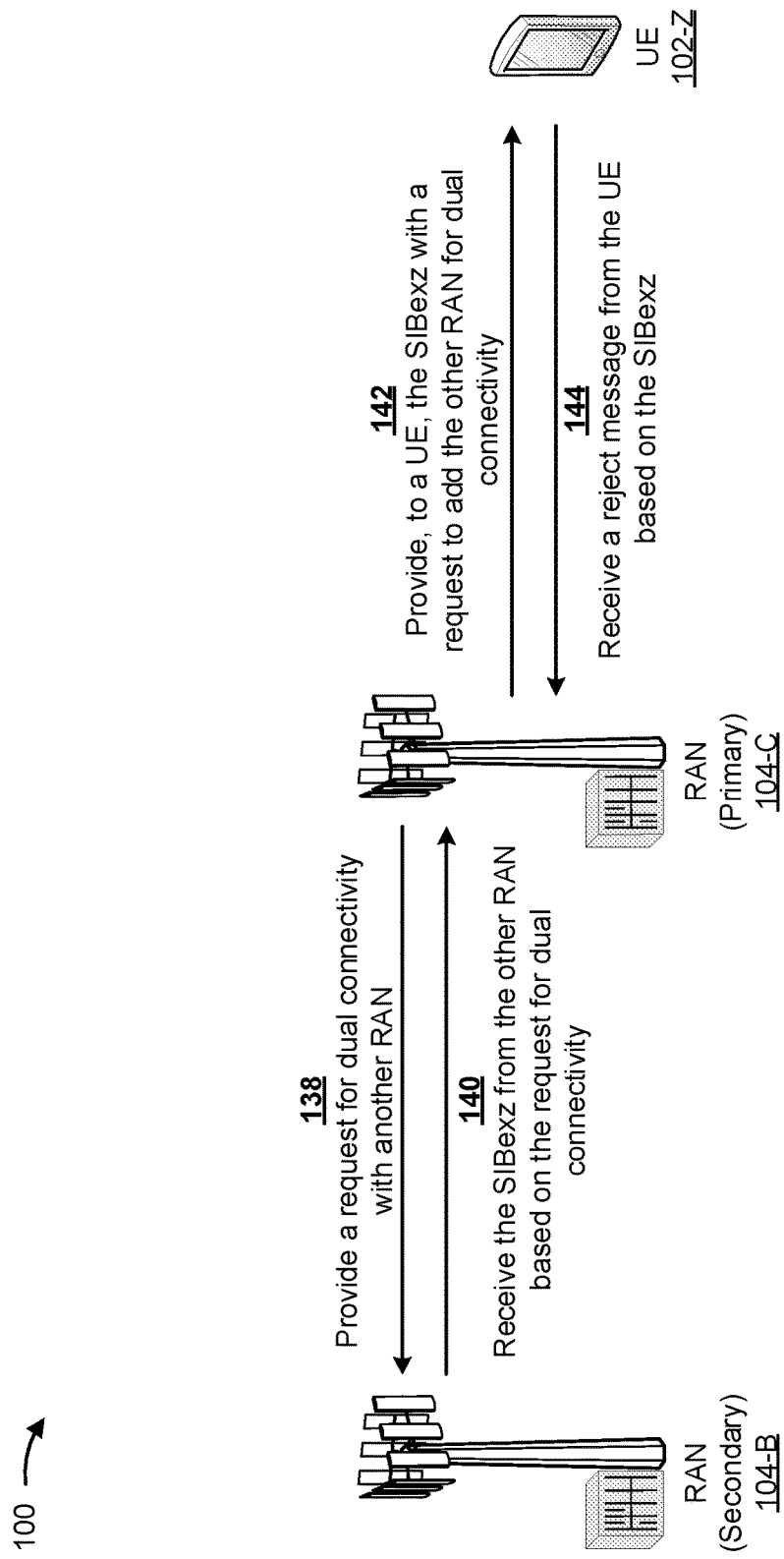

As shown in FIG. 1F, by reference number 138, and when a state of UE 102-Z is a dual connectivity state and RAN 104-C is a primary RAN, RAN 104-C may provide, to a secondary RAN (e.g., RAN 104-B), a request for dual connectivity with RAN 104-B. Dual connectivity utilizes radio resources within multiple carriers to improve UE 102 throughput. The difference between dual connectivity and carrier aggregation is in application scenarios and hence implementation. Carrier aggregation is for scenarios where a backhaul between RANs is ideal, while dual connectivity is for non-ideal backhaul (e.g., relatively large delay between RANs).

As further shown in FIG. 1F, and by reference number 140, RAN 104-C may receive, from RAN 104-B, the exclusion zone SIB, with the data identifying the location coordinate points of the exclusion zone, based on the request for dual connectivity. As shown by reference number 142, RAN 104-C may provide, to UE 102-Z, the exclusion zone SIB with a request to add RAN 104-B for dual connectivity purposes. In some implementations, the request to add RAN 104-B includes an RRC reconfiguration message indicating that UE 102-Z is to be reconfigured to add RAN 104-B. UE 102-Z may read the exclusion zone SIB to identify the location coordinate points of the exclusion zone, and may determine whether UE 102-Z is located in the exclusion zone based on the location coordinate points and a location of UE 102-Z. If UE 102-Z determines that UE 102-Z is located in the exclusion zone, UE 102-Z may reject the request to add RAN 104-B with a reject message. In some implementations, the reject message includes an RRC reconfiguration failure message (e.g., with a reason code indicating that UE 102-Z is located in the exclusion zone). If UE 102-Z determines that UE 102-Z is not located in the exclusion zone, UE 102-Z may accept the request to add RAN 104-B and may add RAN 104-B for dual connectivity purposes.

As further shown in FIG. 1F, and by reference number 144, since UE 102-Z is located in the exclusion zone, RAN 104-C may receive, from UE 102-Z, the reject message based on the exclusion zone SIB. The reject message may cause RAN 104-C to cease preparing for adding RAN 104-B for UE 102-Z.

In some implementations, and to avoid frequently repeated signaling, RAN 104-C includes a configurable prohibit timer that suspends the dual connectivity process of UE 102-Z until the prohibit timer expires. Upon expiry of the prohibit timer, RAN 104-C may permit any future request to add RAN 104-B based on an assumption that UE 102-Z has moved out of the exclusion zone. In some implementations, if UE 102-Z continues to reject the request to add RAN 104-B after expiration of the timer, RAN 104-C may increase a value of the prohibit timer so that the carrier aggregation process is suspended for a longer period of time. Eventually (e.g., after UE 102-Z still continues to reject the request to add RAN 104-B), RAN 104-C may permanently prevent UE 120-Z from adding RAN 104-B. For example, RAN 104-C may permanently prevent UE 120-Z from adding RAN 104-B when UE 102-Z is a fixed wireless access device operating in the exclusion zone.

As shown in FIG. 1G, UE 102-Y may be moving from a first location (e.g., supported by a serving RAN, such as RAN 104-B) to a second location (e.g., supported by a target RAN, such as RAN 104-C). Thus, UE1 102-Y may enter the exclusion zone when moving from the first location to the second location. UE 102-Y may have received the exclusion zone SIB from RAN 104-B and may identify the location coordinate points of the exclusion zone from the exclusion zone SIB. UE 102-Y may monitor a location of UE 102-Y, and may determine whether UE 102-Y is located in the exclusion zone based on the location coordinate points and the location of UE 102-Y.

As further shown in FIG. 1G, and by reference number 146, if UE 102-Y is about to enter the exclusion zone, UE 102-Y may request (e.g., with a reason code, such as entering the exclusion zone) the serving RAN to hand over UE 102-Y to another frequency band or another RAN (e.g., RAN 104-C). As further shown FIG. 1G, and by reference number 148, UE 102-Y may provide, to the serving RAN, a request for an RRC connection release from the serving RAN. UE 102-Y may receive, from the serving RAN, an RRC connection release based on the request. Once UE 102-Y is released, UE 102-Y may enter into the idle state. In some implementations, UE 102-Y may force itself into the idle state or may attempt to connect to another RAN on a different frequency.

In some implementations, UE 102-Y may not perform an action when UE 102-Y exits the exclusion zone. As further shown in FIG. 1G, and by reference number 150, when UE 102-Y exits the exclusion zone, RAN 104-C may receive, from UE 102-Y, a message indicating that UE 102-Y is exiting from the exclusion zone. Upon receipt of the message, RAN 104-C may remove UE 102-Y from an exclusion zone list and may treat UE 102-Y as a normal device by allowing handover, carrier aggregation, dual connectivity, and/or the like.

In this way, the network device defines an exclusion zone to protect an earth station from UE interference. The exclusion zone may protect the earth station by causing a UE, located near the earth station and attempting to access RAN services in the 5G frequency band, to operate in a restricted mode. Thus, the exclusion zone protects the earth station from UE interference, which conserves computing resources, networking resources, and/or the like that would otherwise have been wasted by incorrect operation of the UE and the earth station due to interference, identifying the interference between the UE and the earth station, correcting the interference between the UE and the earth station, attempting to retrieve data not received due to the interference, and/or the like.

As indicated above, FIGS. 1A-1G are provided merely as examples. Other examples may differ from what was described with regard to FIGS. 1A-1G. The number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of FIGS. 1A-1G may perform one or more functions described as being performed by another set of devices of FIGS. 1A-1G.

Figure 2:
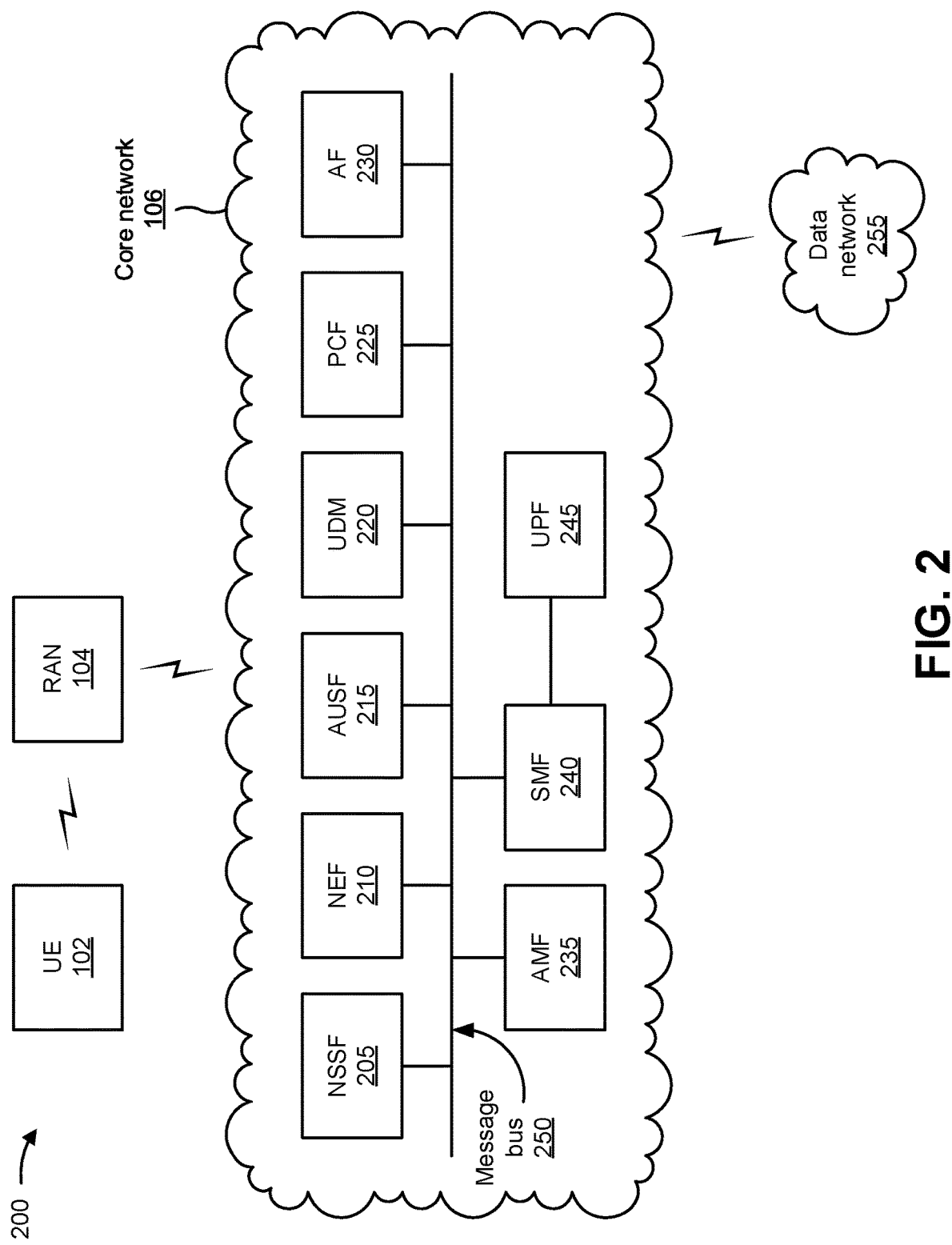
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include UE 102, RAN 104, core network 106, application server 120, and a data network 255. Devices and/or networks of example environment 200 may interconnect via wired connections, wireless connections, or a combination of wired and wireless connections.

UE 102 includes one or more devices capable of receiving, generating, storing, processing, and/or providing information, such as information described herein. For example, UE 102 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 104 may support, for example, a cellular radio access technology (RAT). RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that may support wireless communication for UE 102. RAN 104 may transfer traffic between UE 102 (e.g., using a cellular RAT), one or more base stations (e.g., using a wireless interface or a backhaul interface, such as a wired backhaul interface), and/or core network 106. RAN 104 may provide one or more cells that cover geographic areas.

In some implementations, RAN 104 may perform scheduling and/or resource management for UE 102 covered by RAN 104 (e.g., UE 102 covered by a cell provided by RAN 104). In some implementations, RAN 104 may be controlled or coordinated by a network controller, which may perform load balancing, network-level configuration, and/or the like. The network controller may communicate with RAN 104 via a wireless or wireline backhaul. In some implementations, RAN 104 may include a network controller, a self-organizing network (SON) module or component, or a similar module or component. In other words, RAN 104 may perform network control, scheduling, and/or network management functions (e.g., for uplink, downlink, and/or sidelink communications of UE 102 covered by RAN 104).

In some implementations, core network 106 may include an example functional architecture in which systems and/or methods described herein may be implemented. For example, core network 106 may include an example architecture of a fifth generation (5G) next generation (NG) core network included in a 5G wireless telecommunications system. While the example architecture of core network 106 shown in FIG. 2 may be an example of a service-based architecture, in some implementations, core network 106 may be implemented as a reference-point architecture, a 4G core network, and/or the like.

As shown in FIG. 2, core network 106 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for UE 102. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 102 in the wireless telecommunications system.

UDM 220 includes one or more devices that store user data and profiles in the wireless telecommunications system. UDM 220 may be used for fixed access, mobile access, and/or the like, in core network 106.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communication sessions in the wireless telecommunications system. For example, SMF 240 may configure traffic steering policies at UPF 245, enforce user equipment IP address allocation and policies, and/or the like.

UPF 245 includes one or more devices that serve as an anchor point for intraRAT and/or interRAT mobility. UPF

245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
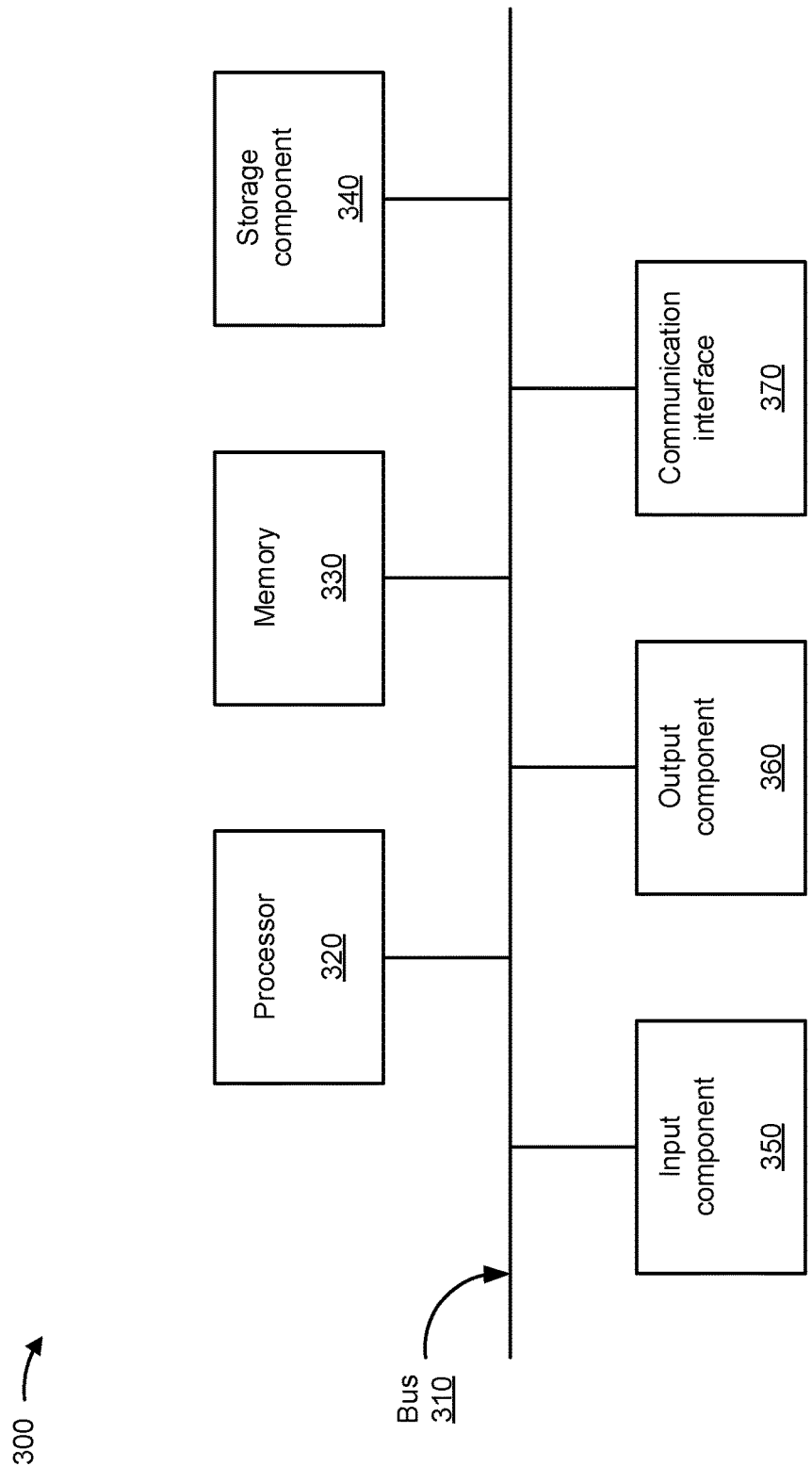
FIG. 3 is a diagram of example components of one or more devices of FIG. 2.

FIG. 3 is a diagram of example components of a device 300. Device 300 may correspond to UE 102, NSSF 205, NEF 210, AUSF 215, UDM 220, PCF 225, AF 230, AMF 235, SMF 240, and/or UPF 245. In some implementations, UE 102, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
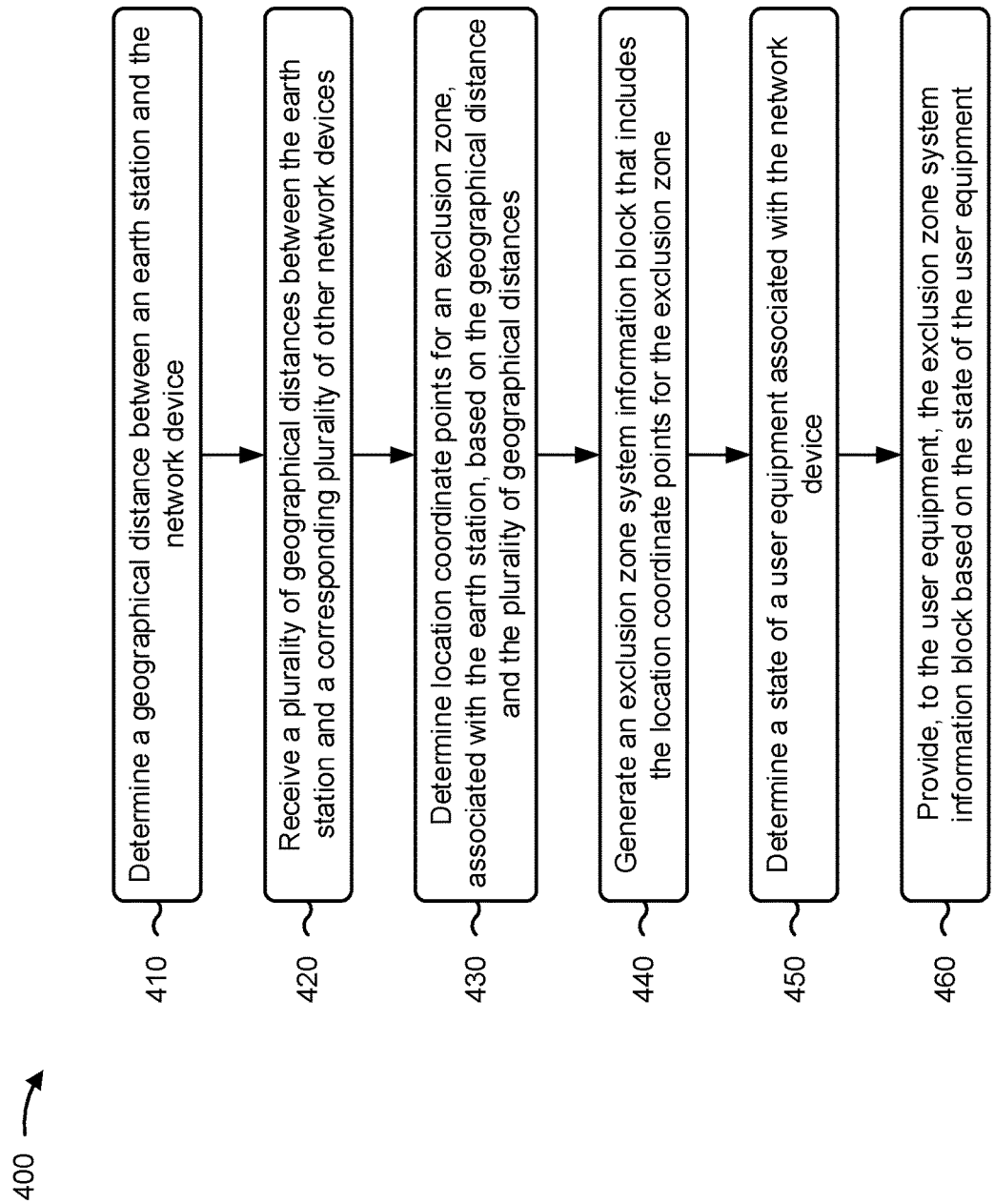
FIG. 4 is a flow chart of an example process for defining an exclusion zone to protect an earth station from user equipment (UE) interference.

FIG. 4 is a flow chart of an example process 400 for acquiring network control data of a user equipment in cellular networks. In some implementations, one or more process blocks of FIG. 4 may be performed by a device (e.g., a network device of RAN 104). In some implementations, one or more process blocks of FIG. 4 may be performed by another device or a group of devices separate from or including the device, such as a UE (e.g., UE 102), an SMF (e.g., SMF 240), a UPF (e.g., UPF 245), and/or the like. Additionally, or alternatively, one or more process blocks of FIG. 4 may be performed by one or more components of device 300, such as processor 320, memory 330, storage component 340, input component 350, output component 360, and/or communication interface 370.

As shown in FIG. 4, process 400 may include determining a geographical distance between an earth station and a network device (block 410). For example, the network device may determine a geographical distance between an earth station and the network device, as described above.

As further shown in FIG. 4, process 400 may include receiving a plurality of geographical distances between the earth station and a corresponding plurality of other network devices (block 420). For example, the network device may receive a plurality of geographical distances between the earth station and a corresponding plurality of other network devices, as described above.

As further shown in FIG. 4, process 400 may include determining location coordinate points for an exclusion zone, associated with the earth station, based on the geographical distance and the plurality of geographical distances (block 430). For example, the network device may determine location coordinate points for an exclusion zone, associated with the earth station, based on the geographical distance and the plurality of geographical distances, as described above.

As further shown in FIG. 4, process 400 may include generating an exclusion zone system information block that includes the location coordinate points for the exclusion zone (block 440). For example, the network device may generate an exclusion zone system information block that includes the location coordinate points for the exclusion zone, as described above.

As further shown in FIG. 4, process 400 may include determining a state of a user equipment associated with the network device (block 450). For example, the network device may determine a state of a user equipment associated with the network device, as described above.

As further shown in FIG. 4, process 400 may include providing, to the user equipment, the exclusion zone system information block based on the state of the user equipment (block 460). For example, the network device may provide, to the user equipment, the exclusion zone system information block based on the state of the user equipment, as described above.

Process 400 may include additional implementations, such as any single implementation or any combination of implementations described below and/or in connection with one or more other processes described elsewhere herein.

In a first implementation, when the state of the user equipment is an idle state or an inactive state, process 400 includes providing the exclusion zone system information block to the user equipment, prior to the user equipment waking up or powering up, wherein the exclusion zone system information block causes the user equipment to not access the radio access network when the user equipment is geographically located within the exclusion zone.

In a second implementation, when the state of the user equipment is a mobility state or a handover state, process 400 includes receiving a measurement report from the user equipment to be handed over to another radio access network; providing a handover request to the other radio access network based on the measurement report; receiving, from the other radio access network, a handover request acknowledgement that includes the exclusion zone system information block; and providing, to the user equipment, a handover command that includes the exclusion zone system information block, wherein the exclusion zone system information block causes the user equipment to reject the handover command when the user equipment is geographically located within the exclusion zone.

In a third implementation, when the state of the user equipment is a mobility state or a handover state, process 400 includes receiving a handover rejected message from the user equipment when the user equipment is geographically located within the exclusion zone, and providing the handover rejected message to the other radio access network to cause the other radio access network to cease preparing for a handover.

In a fourth implementation, when the state of the user equipment is a mobility state or a handover state, process 400 includes starting a timer associated with preventing a handover of the user equipment when the user equipment rejects the handover command, and permitting the handover of the user equipment to the other radio access network when the timer expires.

In a fifth implementation, when the user equipment is entering the exclusion zone, process 400 includes receiving, from the user equipment, a first request to hand over the user equipment to another frequency or to another radio access network; receiving, from the user equipment, a second request for a connection release from the radio access network; handing over the user equipment to the other frequency or to the other radio access network based on the first request; and releasing the user equipment from a connection with the radio access network based on the second request.

In a sixth implementation, after the user equipment has exited the exclusion zone, process 400 includes receiving, from the user equipment, a message indicating that the user equipment has exited from the exclusion zone, and removing the user equipment from an exclusion zone list based on the message.

In a seventh implementation, when the state of the user equipment is a carrier aggregation state and the radio access network is a primary radio access network, process 400 includes providing a request for the exclusion zone system information block to a secondary radio access network; receiving, from the secondary radio access network, the exclusion zone system information block based on the request; providing, to the user equipment, the exclusion zone system information block with a request to add the secondary radio access network; and receiving, from the user equipment and when the user equipment is geographically located within the exclusion zone, a reject message indicating that the user equipment rejects adding the secondary radio access network.

In an eighth implementation, process 400 includes starting a timer associated with preventing addition of the secondary radio access network when the user equipment rejects adding the secondary radio access network, and permitting the user equipment to add the secondary radio access network when the timer expires.

In a ninth implementation, process 400 includes preventing, based on the timer expiring and the user equipment continuing to reject adding the secondary radio access network, the user equipment from adding the secondary radio access network.

In a tenth implementation, when the state of the user equipment is a dual connectivity state and the radio access network is a primary radio access network, process 400 includes providing, to a secondary radio access network, a request for dual connectivity with the secondary radio access network; receiving, from the secondary radio access network, the exclusion zone system information block based on the request; providing, to the user equipment, the exclusion zone system information block with a request to add the secondary radio access network for dual connectivity; and receiving, from the user equipment and when the user equipment is geographically located within the exclusion zone, a reject message indicating that the user equipment rejects adding the secondary radio access network for dual connectivity.

In an eleventh implementation, process 400 includes starting a timer associated with preventing addition of the secondary radio access network for dual connectivity when the user equipment rejects adding the secondary radio access network for dual connectivity, and permitting the user equipment to add the secondary radio access network for dual connectivity when the timer expires.

In a twelfth implementation, process 400 includes permanently preventing, based on the timer expiring and the user equipment continuing to reject adding the secondary radio access network for dual connectivity, the user equipment from adding the secondary radio access network for dual connectivity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   determining, by a network device of a radio access network, a geographical distance between an earth station and the network device;
   receiving, by the network device, a plurality of geographical distances between the earth station and a corresponding plurality of other network devices;
   determining, by the network device, location coordinate points for an exclusion zone, associated with the earth station, based on the geographical distance and the plurality of geographical distances;
   generating, by the network device, an exclusion zone system information block that includes the location coordinate points for the exclusion zone;
   determining, by the network device, a state of a user equipment associated with the network device; and
   providing, by the network device and to the user equipment, the exclusion zone system information block based on the state of the user equipment.

2. The method of claim 1, wherein, when the state of the user equipment is an idle state or an inactive state, providing the exclusion zone system information block comprises:
   providing the exclusion zone system information block to the user equipment, prior to the user equipment waking up or powering up,
      wherein the exclusion zone system information block causes the user equipment to not access the radio access network when the user equipment is geographically located within the exclusion zone.

3. The method of claim 1, wherein, when the state of the user equipment is a mobility state or a handover state, the method further comprises:
   receiving a measurement report from the user equipment to be handed over to another radio access network;
   providing a handover request to the other radio access network based on the measurement report; and
   receiving, from the other radio access network, a handover request acknowledgement that includes the exclusion zone system information block,
      wherein providing the exclusion zone system information block comprises:
         providing, to the user equipment, a handover command that includes the exclusion zone system information block,
      wherein the exclusion zone system information block causes the user equipment to reject the handover command when the user equipment is geographically located within the exclusion zone.

4. The method of claim 3, further comprising:
   receiving a handover rejected message from the user equipment when the user equipment is geographically located within the exclusion zone; and
   providing the handover rejected message to the other radio access network to cause the other radio access network to cease preparing for a handover.

5. The method of claim 3, further comprising:
   starting a timer associated with preventing a handover of the user equipment when the user equipment rejects the handover command; and
   permitting the handover of the user equipment to the other radio access network when the timer expires.
6. The method of claim 1, wherein, when the user equipment is entering the exclusion zone, the method further comprises:
   receiving, from the user equipment, a first request to hand over the user equipment to another frequency or to another radio access network;
   receiving, from the user equipment, a second request for a connection release from the radio access network;
   handing over the user equipment to the other frequency or to the other radio access network based on the first request; and
   releasing the user equipment from a connection with the radio access network based on the second request.
7. The method of claim 1, wherein, after the user equipment has exited the exclusion zone, the method further comprises:
   receiving, from the user equipment, a message indicating that the user equipment has exited from the exclusion zone; and
   removing the user equipment from an exclusion zone list based on the message.
8. A network device of a radio access network, the network device comprising:
   one or more processors configured to:
      determine a geographical distance between an earth station and the network device;
      receive a plurality of geographical distances between the earth station and a corresponding plurality of other network devices;
      determine respective probabilities of a plurality of user equipment, within the geographical distance and the plurality of geographical distances, impacting operation of the earth station;
      determine location coordinate points for an exclusion zone, associated with the earth station, based on the geographical distance, the plurality of geographical distances, and the probabilities;
      generate an exclusion zone system information block that includes the location coordinate points for the exclusion zone;
      determine a state of a user equipment associated with the network device; and
      provide, to the user equipment, the exclusion zone system information block based on the state of the user equipment.
9. The network device of claim 8, wherein, when the state of the user equipment is a carrier aggregation state and the radio access network is a primary radio access network, the one or more processors are further configured to:
   provide a request for the exclusion zone system information block to a secondary radio access network;
   receive, from the secondary radio access network, the exclusion zone system information block based on the request;
   provide, to the user equipment, the exclusion zone system information block with a request to add the secondary radio access network; and
   receive, from the user equipment and when the user equipment is geographically located within the exclusion zone, a reject message indicating that the user equipment rejects adding the secondary radio access network.
10. The network device of claim 9, wherein the one or more processors are further configured to:
   start a timer associated with preventing addition of the secondary radio access network when the user equipment rejects adding the secondary radio access network; and
   permit the user equipment to add the secondary radio access network when the timer expires.
11. The network device of claim 10, wherein the one or more processors are further configured to:
   prevent, based on the timer expiring and the user equipment continuing to reject adding the secondary radio access network, the user equipment from adding the secondary radio access network.
12. The network device of claim 8, wherein, when the state of the user equipment is a dual connectivity state and the radio access network is a primary radio access network, the one or more processors are further configured to:
   provide, to a secondary radio access network, a request for dual connectivity with the secondary radio access network;
   receive, from the secondary radio access network, the exclusion zone system information block based on the request;
   provide, to the user equipment, the exclusion zone system information block with a request to add the secondary radio access network for dual connectivity; and
   receive, from the user equipment and when the user equipment is geographically located within the exclusion zone, a reject message indicating that the user equipment rejects adding the secondary radio access network for dual connectivity.
13. The network device of claim 12, wherein the one or more processors are further configured to:
   start a timer associated with preventing addition of the secondary radio access network for dual connectivity when the user equipment rejects adding the secondary radio access network for dual connectivity; and
   permit the user equipment to add the secondary radio access network for dual connectivity when the timer expires.
14. The network device of claim 13, wherein the one or more processors are further configured to:
   permanently prevent, based on the timer expiring and the user equipment continuing to reject adding the secondary radio access network for dual connectivity, the user equipment from adding the secondary radio access network for dual connectivity.
15. A non-transitory computer-readable medium storing instructions, the instructions comprising:
   one or more instructions that, when executed by one or more processors of a network device of a radio access network, cause the one or more processors to:
      determine a geographical distance between an earth station and the network device;
      receive a plurality of geographical distances between the earth station and a corresponding plurality of other network devices;
      determine location coordinate points for an exclusion zone, associated with the earth station, based on the geographical distance and the plurality of geographical distances, wherein the exclusion zone is to prevent one or more user equipment from interfering with a signal of the earth station;

generate an information block that includes the location coordinate points for the exclusion zone;

determine a state of a user equipment associated with the network device; and provide, to the user equipment, the information block based on the state of the user equipment.

16. The non-transitory computer-readable medium of claim 15, wherein, when the state of the user equipment is an idle state or an inactive state, the one or more instructions, that cause the one or more processors to provide the information block, cause the one or more processors to:

provide the information block to the user equipment, prior to the user equipment waking up or powering up, wherein the information block causes the user equipment to not access the radio access network when the user equipment is geographically located within the exclusion zone.

17. The non-transitory computer-readable medium of claim 15, wherein, when the state of the user equipment is a mobility state or a handover state, the instructions further comprise:

one or more instructions that, when executed by the one or more processors, cause the one or more processors to:

receive a measurement report from the user equipment to be handed over to another radio access network;

provide a handover request to the other radio access network based on the measurement report; and receive, from the other radio access network, a handover request acknowledgement that includes the information block, wherein the one or more instructions, that cause the one or more processors to provide the information block, cause the one or more processors to:

provide, to the user equipment, a handover command that includes the information block, wherein the information block causes the user equipment to reject the handover command when the user equipment is geographically located within the exclusion zone.

18. The non-transitory computer-readable medium of claim 15, wherein, when the user equipment is entering the exclusion zone, the instructions further comprise:

one or more instructions that, when executed by the one or more processors, cause the one or more processors to:

receive, from the user equipment, a first request to hand over the user equipment to another frequency or to another radio access network;

receive, from the user equipment, a second request for a connection release from the radio access network;

hand over the user equipment to the other frequency or to the other radio access network based on the first request; and release the user equipment from a connection with the radio access network based on the second request.

19. The non-transitory computer-readable medium of claim 15, wherein, when the state of the user equipment is a carrier aggregation state and the radio access network is a primary radio access network, the instructions further comprise:

one or more instructions that, when executed by the one or more processors, cause the one or more processors to:

provide a request for the information block to a secondary radio access network;

receive, from the secondary radio access network, the information block based on the request;

provide, to the user equipment, the information block with a request to add the secondary radio access network; and receive, from the user equipment and when the user equipment is geographically located within the exclusion zone, a reject message indicating that the user equipment rejects adding the secondary radio access network.

20. The non-transitory computer-readable medium of claim 15, wherein, when the state of the user equipment is a dual connectivity state and the radio access network is a primary radio access network, the instructions further comprise:

one or more instructions that, when executed by the one or more processors, cause the one or more processors to:

provide, to a secondary radio access network, a request for dual connectivity with the secondary radio access network;

receive, from the secondary radio access network, the information block based on the request;

provide, to the user equipment, the information block with a request to add the secondary radio access network for dual connectivity; and receive, from the user equipment and when the user equipment is geographically located within the exclusion zone, a reject message indicating that the user equipment rejects adding the secondary radio access network for dual connectivity.

\* \* \* \* \*